(12) United States Patent
Savoor et al.

(10) Patent No.: US 8,214,487 B2
(45) Date of Patent: Jul. 3, 2012

(54) SYSTEM AND METHOD TO DETERMINE NETWORK USAGE

(75) Inventors: Raghvendra Savoor, Walnut Creek, CA (US); Stuart Blackburn, San Ramon, CA (US); Orestis Manthoulis, Tiburon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 464 days.

(21) Appl. No.: 12/482,065

(22) Filed: Jun. 10, 2009

(65) Prior Publication Data

US 2010/0318647 A1    Dec. 16, 2010

(51) Int. Cl.
    *G06F 15/173* (2006.01)
(52) U.S. Cl. ........ 709/224; 709/223; 709/225; 370/252; 370/253; 370/254; 705/52; 705/412
(58) Field of Classification Search .................. None
    See application file for complete search history.

(56) References Cited

U.S. PATENT DOCUMENTS

| | | | |
|---|---|---|---|
| 5,615,351 A | 3/1997 | Loeb | |
| 7,020,628 B2 * | 3/2006 | Peterson et al. | 705/32 |
| 7,024,468 B1 * | 4/2006 | Meyer et al. | 709/220 |
| 7,245,932 B2 * | 7/2007 | Florkey et al. | 455/518 |
| 7,272,115 B2 * | 9/2007 | Maher et al. | 370/253 |
| 7,280,816 B2 * | 10/2007 | Fratti et al. | 455/405 |
| 7,308,198 B1 * | 12/2007 | Chudak et al. | 398/58 |
| 7,321,656 B2 * | 1/2008 | Bevente et al. | 379/121.02 |
| 7,369,564 B1 * | 5/2008 | Miernik et al. | 370/412 |
| 7,457,608 B2 * | 11/2008 | Shah | 455/351 |
| 7,987,122 B2 * | 7/2011 | Bevente et al. | 705/34 |
| 8,023,425 B2 * | 9/2011 | Raleigh | 370/252 |
| 2001/0027449 A1 * | 10/2001 | Wright | 705/412 |
| 2002/0078194 A1 | 6/2002 | Neti | |
| 2002/0122544 A1 | 9/2002 | Williams | |
| 2002/0133473 A1 * | 9/2002 | Grande et al. | 705/418 |
| 2004/0015497 A1 | 1/2004 | Swarna | |
| 2004/0039809 A1 * | 2/2004 | Ranous et al. | 709/223 |
| 2004/0148384 A1 | 7/2004 | Ramakrishnan | |
| 2004/0264443 A1 * | 12/2004 | Beck et al. | 370/352 |
| 2005/0055288 A1 * | 3/2005 | Bevente et al. | 705/30 |
| 2005/0096010 A1 * | 5/2005 | Benco et al. | 455/406 |
| 2005/0177515 A1 * | 8/2005 | Kalavade et al. | 705/52 |
| 2005/0243972 A1 | 11/2005 | McKinnel | |
| 2006/0215565 A1 | 9/2006 | Borella | |
| 2006/0268902 A1 | 11/2006 | Bonner | |
| 2007/0189514 A1 * | 8/2007 | Mehta et al. | 380/28 |
| 2007/0208851 A1 | 9/2007 | Unkenholz | |
| 2007/0291678 A1 * | 12/2007 | Chowdhury et al. | 370/328 |
| 2008/0052206 A1 * | 2/2008 | Edwards et al. | 705/34 |
| 2008/0052387 A1 * | 2/2008 | Heinz et al. | 709/223 |
| 2008/0069324 A1 * | 3/2008 | Bevente et al. | 379/114.22 |
| 2008/0096524 A1 * | 4/2008 | True et al. | 455/406 |

(Continued)

*Primary Examiner* — Backhean Tiv
(74) *Attorney, Agent, or Firm* — Toler Law Group, PC

(57) ABSTRACT

Systems and methods to measure network usage are provided. A particular method includes collecting first usage data from a first network device of a network at a network usage tracking system. The first network device determines the first usage data based on an inband measurement of data passing through the first network device. The method includes collecting second usage data from a second network device of the network at the network usage tracking system. The first network device and the second network device are different network devices. The method includes matching the first usage data and the second usage data to user accounts. The network usage data is determined based on the first usage data, the second usage data, and the user accounts.

22 Claims, 7 Drawing Sheets

U.S. PATENT DOCUMENTS

| | | | |
|---|---|---|---|
| 2009/0024728 A1* | 1/2009 | Russell | 709/223 |
| 2009/0052424 A1* | 2/2009 | Shah | 370/338 |
| 2010/0031157 A1* | 2/2010 | Neer et al. | 715/738 |
| 2010/0088173 A1* | 4/2010 | Kulla et al. | 705/14.31 |
| 2010/0144310 A1* | 6/2010 | Bedingfield et al. | 455/405 |
| 2010/0188990 A1* | 7/2010 | Raleigh | 370/252 |
| 2010/0188991 A1* | 7/2010 | Raleigh | 370/252 |
| 2010/0188992 A1* | 7/2010 | Raleigh | 370/252 |
| 2010/0223096 A1* | 9/2010 | Bosan et al. | 705/10 |
| 2010/0235433 A1* | 9/2010 | Ansari et al. | 709/203 |
| 2010/0318647 A1* | 12/2010 | Savoor et al. | 709/224 |
| 2010/0332615 A1* | 12/2010 | Short et al. | 709/217 |

* cited by examiner

SYSTEM AND METHOD TO DETERMINE NETWORK USAGE

FIELD OF THE DISCLOSURE

The present disclosure is generally related to determining network usage.

BACKGROUND

The communication industry is institutionalizing usage based billing for broadband connections. For example, a communications service provider may charge a base fee for a certain level of service and charge extra fees for usage above a threshold. Usage based billing is a change from flat fee billing and an "all you can consume" type of service model. Service providers are implementing customized billing services using usage based models. Vendors are marketing systems to implement usage based billing. Certain approaches rely on external devices, such as deep packet inspection (DPI) devices and other monitoring devices. The devices may need to be tuned using deployed transport network technology (e.g., digital subscriber line (DSL) technology, ATM (asynchronous transfer mode) technology, frame relay technology, Ethernet technology, worldwide interoperability for microwave access (WiMax) technology, etc.), by network topology/hierarchy or both. Providing network usage by more than one method may improve the reliability and accuracy of network usage monitoring.

DETAILED DESCRIPTION

Figure 1:
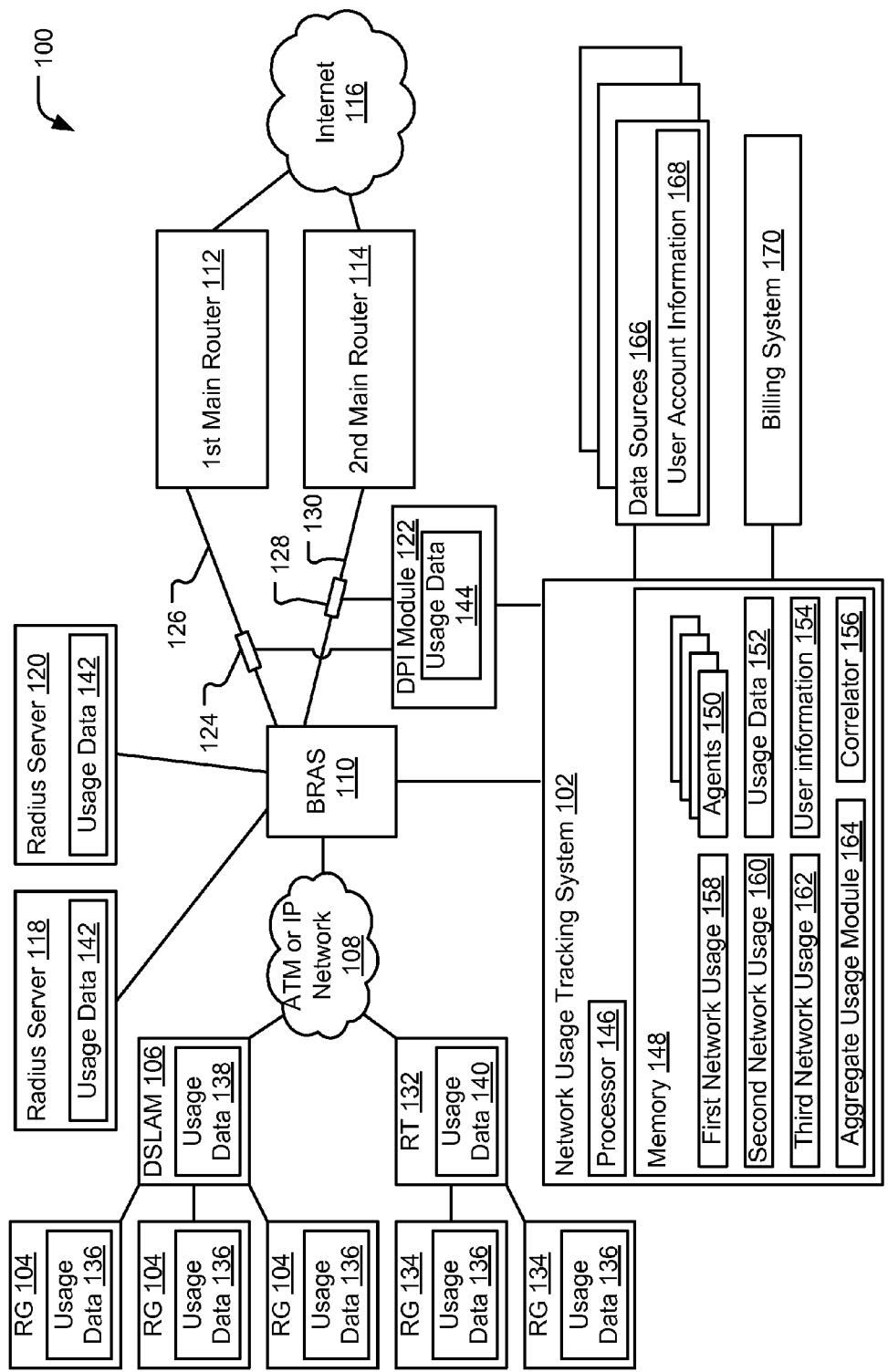
FIG. 1 is a block diagram of a first particular embodiment of a system to determine network usage.

Systems and methods to determine network usage are provided. The usage may be broadband usage. A particular method includes collecting first usage data from a first network device at a network usage tracking system. The first usage data is associated with usage of a network at a first location. The method includes collecting second usage data from a second network device at the network usage tracking system. The second usage data is associated with usage of the network for a particular user and network address. The method includes retrieving user information at the network usage tracking system. The user information includes information associating the first usage data with a user account and information associating the second usage data with the user account. The method includes determining first network usage at the first location for the user account for a first time interval based on the first usage data and the user information. The method includes determining second network usage for the user account for the first time interval based on the second usage data and the user information. The method also includes sending usage data for the user account from the network usage tracking system to a billing system. The usage data may include at least a portion of the first network usage.

A particular network usage tracking system includes at least one processor and at least one memory accessible to the at least one processor. The memory includes a first agent executable by the at least one processor to retrieve first usage data. The first usage data is associated with usage of a network by location. The memory includes a second agent executable by the at least one processor to retrieve second usage data. The second usage data is associated with usage of the network by session. The memory also includes a third agent executable by the at least one processor to retrieve user information including information to enable association of portions of the first usage data to user accounts and to enable association of portions of the second usage data to the user accounts. The at least one processor determines first network usage associated with at least one user account for a first time period based on the first usage data and the user information. The at least one processor determines second network usage associated with at least one user account for the first time period based on the second usage data and the user information. Also, the network usage tracking system is configured to send usage data associated with the at least one user account to a billing system. The usage data may include at least a portion of the first network usage. The usage data may include the first network usage and the second network usage.

A particular network usage tracking system includes at least one processor and at least one memory accessible to the at least one processor. The memory includes a first agent executable by the at least one processor to retrieve first usage data. The first usage data is associated with usage of a network by one or more sessions. The memory includes a second agent executable by the at least one processor to retrieve second usage data. The second usage data is associated with usage of the network based on user identification and network address information. The memory also includes a third agent executable by the at least one processor to retrieve user information including information to enable association of portions of the first usage data to user accounts and to enable association of portions of the second usage data to the user accounts. The at least one processor determines first network usage for at least one user account for a first time period based on the first usage data and the user information. The at least one processor determines second network usage for the at least one user account for the first time period based on the second usage data and the user information. The network usage tracking system is configured to send usage data associated with the at least one user account to a billing system. The usage data may include at least a portion of the first network usage.

A particular method includes collecting first usage data from a first network device of a network at a network usage tracking system. The first network device determines the first usage data based on an inband measurement of data passing through the first network device. The method includes collecting second usage data from a second network device of the network at the network usage tracking system. The first network device and the second network device are different network devices. The method includes matching the first usage data to user accounts and matching the second usage data to the user accounts. Further, the method includes storing network usage data for the user accounts at a memory of the network usage tracking system. The network usage data is determined based on the first usage data, the second usage data, and the user accounts.

Referring to FIG. 1, a block diagram of a particular embodiment of a system to determine network usage is illustrated and designated generally 100. The network usage may be broadband usage. The network usage may include downloaded data and uploaded data. The system 100 may include a plurality of communication elements including network devices and a network usage tracking system 102. The plurality of communication elements may include a plurality of residential gateways (RGs) 104, a digital subscriber line access multiplexer (DSLAM) 106, an asynchronous transfer module (ATM) or internet protocol (IP) network 108, a broadband remote access server (BRAS) 110, a set of representative routers (e.g., a first main router 112 and a second main router 114), and an internet network 116. A remote authentication dial in user service (Radius) server 118 coupled to the BRAS 110 may monitor usage of the first main router 112. A Radius server 120 coupled to the BRAS 110 may monitor usage of the second main router 114.

The system 100 may include a deep packet inspection probe (DPI) module 122. A first probe 124 from the DPI module 122 may be coupled to a first link 126 between the BRAS 110 and the first main router 112. A second probe 128 from the DPI module 122 may be coupled to a second link 130 between the BRAS 110 and the second main router 114.

The system 100 may include a remote terminal (RT) 132 coupled to a second plurality of RGs 134. The RT 132 may be coupled to the ATM 108 via a high speed data connection.

Many of the network devices may track network usage. For example, the RGs 104, 134 may store usage data 136, the DSLAM 106 may store usage data 138, the RT 132 may store usage data 140, the Radius servers 118, 120 may store usage data 142, and the DPI module 122 may store usage data 144. The usage data 136, 138, 140, 142 and 144 may include information that enables calculation of uploaded bytes, downloaded bytes and identification of the network device associated with the usage data 136, 138, 140, 142 and 144.

The network usage tracking system 102 may include at least one processor 146 and at least one memory 148. The memory 148 may include agents 150, usage data 152, user information 154, a correlator 156, first network usage 158, second network usage 160, third network usage 162, and an aggregate usage module 164. The agents 150 may be processor implemented instructions that retrieve data from network devices, data sources 166 or both. One or more agents 150 may retrieve the usage data 152. The usage data 152 may be retrieved from one or more of the various network devices. For example, the usage data 152 may include the usage data 136 from the RGs 104, 134, the usage data 138 from the DSLAM 106, the usage data 144 from the DPI module 122, the usage data 142 from the Radius servers 118, 120 or combinations thereof. The agents 150 may regularly retrieve the usage data 152 at set periods of time, such as during periodic collection intervals.

One or more of the agents 150 may retrieve the user information 154. The user information 154 may be retrieved from the network device (e.g., the DSLAM 106, the RT 132, the BRAS 110, the Radius servers 118, 120 or combinations thereof) and from one or more of the data sources 166. One or more of the data sources 166 may include user account information 168. The data sources 166 may include a customer database of a service provider and databases that relate the network devices to particular user accounts.

The correlator 156 may determine and store the first network usage 158 for user accounts, the second network usage 160 for user accounts, and the third network usage 162 for user accounts from the usage data 152 and the user information 154. In an embodiment, the first network usage 158 corresponds to network usage for user accounts by location using physical port level identifiers of physical equipment facing subscriber connections (e.g., based on the usage data 138 from the DSLAM 106, the usage data 140 from the RT 132, the usage data 136 from the RGs 104, 134 or combinations thereof), the second network usage 160 corresponds to network usage for the user accounts by session (e.g., based on the usage data 142 from the Radius servers 118, 120), and the third network usage 162 corresponds to network usage at session level and classified by destination and source address (e.g., based on the user data 144 from the DPI module 122).

In some embodiments, the aggregate usage module 164 may be used. For example, for a particular time interval, the first network usage 158 for the particular time interval may be significantly different than the second network usage 160 for the particular time interval or the third network usage data 162 for the particular time interval (e.g., different by more than a threshold value, such as, but not limited to 1%, 5%, 10% or more). The aggregate usage module 164 may adjust the first network usage 158 for the time period to a different value. For example, the aggregate usage module 164 may adjust the first network usage 158 to the second network usage 160 for the particular time interval, to the third network usage 162 for the particular time interval, or to a value based on both the second network usage 160 for the particular time interval and the third network usage 162 for the particular time interval (e.g., an average usage).

The network usage tracking system 102 may track network usage for selected time periods (e.g., by day or by week) and may track cumulative network usage during a billing cycle. At least a portion of the first network usage 158, the second network usage 160, and the third network usage 162 may be provided to a billing system 170. For example, the cumulative network usage from the first network usage 158, the second network usage 160, and the third network usage 162 may be sent to the billing system 170 at the end of a billing cycle, and the cumulative network usage for each of the first network usage 158, the second network usage 160, and the third network usage 162 may be set to zero at the start of a new billing cycle.

In some embodiments, when the cumulative network usage for a user account exceeds a threshold during a billing cycle, a warning is sent to the billing system 170 for the user account. The cumulative network usage may be the cumulative network usage calculated from one or more of the first network usage 158, the second network usage 160, and the third network usage 162. The billing system 170 may send a warning to a contact for the user account that informs the contact that the user account has or is about to exceed the threshold usage. The warning may indicate that additional usage beyond the threshold usage will result in extra usage charges.

During operation of the system 100, data may be communicated from an end point of the system 100, such as at one or more of the RGs 104, 134. Each RG 104, 134 may be located at a business, a residence, or any other location having access to an end user device, such as an end user computer or other similar communication device having data capabilities. Data may be communicated from one or more of the RGs 104 to the DSLAM 106, or from one or more of the RGs 134 to the RT 132. The data may be transmitted by wireless transmission, by cable, by fiber, by a digital subscriber line or by a different medium. The DSLAM 106 and the RT 132 may collect data from multiple RGs 104, 134 and transmit the data over a high speed data connection to the ATM network 108. The data may be communicated by a virtual connection as a plurality of data packets, cells, frames or combinations thereof. The DSLAM 106 and the RT 132 may include counters that count the number of uploaded cells and the number of downloaded cells. For the DSLAM 106, the number of uploaded cells and the number of downloaded cells may be included in the usage data 138. For the RT 132, the number of uploaded cells and the number of downloaded cells may be included in the usage data 140.

The data sent through the ATM network 108 may be received by the BRAS 110. The BRAS 110 may forward the data to one or more of the main routers 112, 114. The main routers 112, 114 may forward the data to the internet 116. The Radius servers 118 and 120 may track network usage by session. A session may begin when one of the RGs 104, 134 is turned on and establishes contact with one of the routers 112, 114. A session may end when the RG 104, 134 is turned off or otherwise loses contact with the routers 112, 114. Tracked network usage may be stored as the usage data 142 in the Radius servers 118, 120.

Once data is received at the internet 116, the data may be routed over a wide area network to destination devices, such as a destination DSLAM or other telephony or network device that sends data to a receiving end user. Alternatively, data received at the internet 116 may be routed and stored at one or more servers or other computing devices having access to the internet 116.

Similarly, data received over the internet 116 may be communicated to one or more of the main routers 112, 114. The data received at the main routers 112, 114 may be forwarded to the BRAS 110. The BRAS 110 may forward the data through the ATM network 108 to the DSLAM 106, the RT 132 or both for delivery to one or more of the RGs 104, 134. Thus, the system 100 allows bi-directional communication between various end user devices over a local or wide area network.

The system 100 may be operable to determine network usage on broadband connections in a transport agnostic manner. For example, the network usage tracking system 102 may determine usage based on network device location, sessions and authenticated users of the sessions. The network usage from these sources may be aggregated to account for any gaps or other problems occurring in one of the database collection sources. The resulting usage may be more reliable than data collected at only a single point of the system 100. In some embodiments, the network usage may be obtained without the need for external devices, such as the DPI module 122. For example, network usage may be calculated based on the usage data 136 obtained from RGs 104, 134, the usage data 138 obtained from the DSLAM 106, the usage data 140 obtained from the RT 132 and the usage data 142 obtained from the Radius servers 118, 120.

By collecting network usage data at different locations within the system 100 and by evaluating the collected usage data with respect to user information independently collected, the network usage tracking system 102 may correlate the collected data and provide network usage information having improved accuracy. Since the network usage tracking system 102 collects data from multiple sources and multiple locations, in the event that certain data is unavailable, corrupted, or otherwise unusable, other data from a different location may be used to supplement or replace the unavailable, corrupted, or otherwise unusable data.

Particular applications of the network usage data obtained from the network usage tracking system 102 include fraud detection, fraud prevention, customer alerting, and network management. For example, the network usage tracking system 102 may be used to identify unusual patterns or patterns inconsistent with prior historical usage to detect anomalous situations that may merit further action by a network administrator. Usage by location, usage by session and usage by session and authenticated user should be in agreement with each other. Significant disagreement between the usage by location, the usage by session, and the usage by session and authenticated user may indicate fraudulent usage, or other potential issues.

Some of the devices used to track network usage by location may monitor the usage in a manner that includes system overhead information in the usage data. To account for the system overhead information, network usage from such devices may be adjusted by the use of correction factors. For example, data passing through the DSLAM 106 and the RT 132 may include system overhead information. Initial values for the correction factors may be based on pilot studies of network usage using the system 100 in selected areas. Statistical data for network usage based on the location and the network usage by session, by authenticated user of the session, by application types of each session, or combinations thereof may be collected and used to update the correction factors so that the correction factors are based on usage of the system 100. The correlator 156 may store values for correction factors for the network devices (e.g., for the DSLAM 106 and the RT 132) and statistical data used to update correction factors. The statistical data for a particular device may include an uploaded correction factor and a downloaded correction factor calculated for a particular time period. For the time period, reliable values for the uploaded bytes and the downloaded bytes are determined based on usage obtained from another network device (e.g., the usage obtained from the Radius servers 118, 120 or the usage obtained from DPI module 122) for the same time period. The uploaded correction factor for the particular time period may be calculated as uploaded bytes obtained from the other network device divided by the total uploaded bytes calculated from usage data obtained for the particular device for the same time period. The downloaded correction factor for the particular time period may be calculated as downloaded bytes obtained from the other network device divided by the total downloaded bytes calculated from usage data obtained for the particular device for the same time period.

While the network usage tracking system 102 has been shown for traffic monitoring with respect to digital subscriber line traffic, it should be understood that the system 102 may be used to monitor and process data in a variety of different types of communication systems. For example, the network usage tracking system 102 may be used in connection with an internet protocol data communications system such as an Internet Protocol Television (IPTV) system. Alternatively, the network usage tracking system 102 may be used in connection with other high speed data communication systems, such as cable access television systems, satellite television, or high speed data communication networks.

Figure 2:
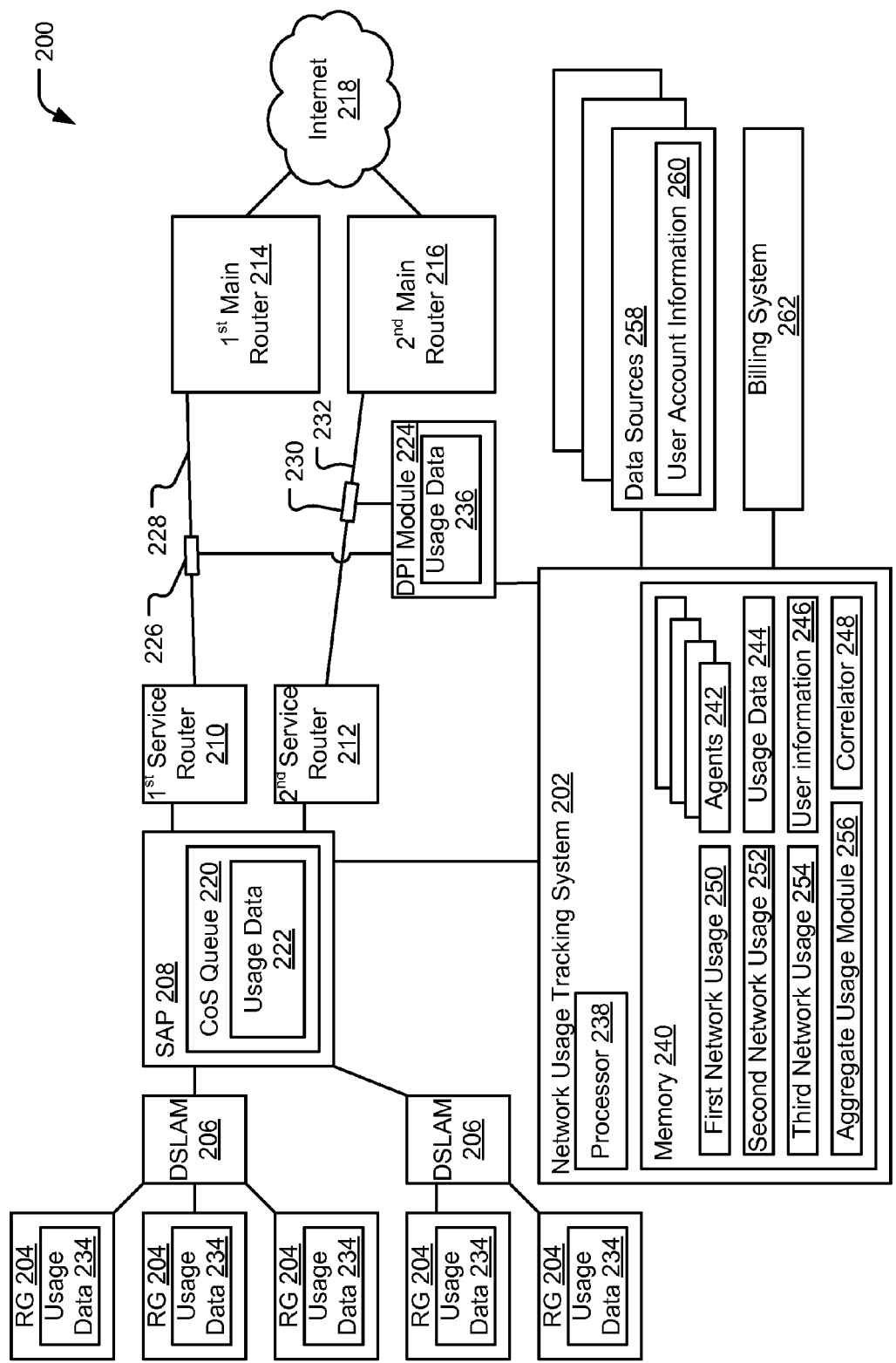
FIG. 2 is a block diagram of a second particular embodiment of a system to determine network usage.

Referring to FIG. 2, a block diagram of a second particular embodiment of a system to determine network usage is illustrated and designated generally 200. The network usage may be broadband usage. The system 200 may include a plurality of communication elements including network devices and a network usage tracking system 202. The plurality of communication elements may include a plurality of residential gateways (RGs) 204, digital subscriber line access multiplexers (DSLAMs) 206, a service access point (SAP) 208, a first service router 210, a second service router 212, a first main router 214, a second main router 216, and an internet network 116. The system 200 may be capable of providing both television programming and broadband internet access to end users. While two service routers 210, 212 and two main routers 214, 216 are illustrated, it should be understood that one or more service routers may be used within the system 200.

The SAP 208 may include a class of service (CoS) queue 220 or other buffer arrangement to collect and store data. The data stored in the CoS queue 220 may include broadband usage data 222.

The system 200 may also include a deep packet inspection probe (DPI) module 224. A first probe 226 from the DPI module 224 may be coupled to a first link 228 between the first service router 210 and the first main router 214. A second probe 230 from the DPI module 224 may be coupled to a second link 232 between the second service router 212 and the second main router 216.

Many of the network devices may track network usage. For example, the RGs 204 may store usage data 234, the SAP 208 may store usage data 222, and the DPI module 224 may store usage data 236. In some embodiments, certain of the RGs 204 may be set-top box devices that measure both video transmission data and broadband data transmission without distinguishing between the two types of data. The usage data 234 obtained from such set-top box devices may not be used to directly determine broadband usage.

The network usage tracking system 202 may include at least one processor 238 and at least one memory 240. The memory 240 may include agents 242, usage data 244, user information 246, a correlator 248, first network usage 250, second network usage 252, third network usage 254, and an aggregate usage module 256. The agents 242 may be processor implemented instructions that retrieve data from one or more network devices, the data sources 258 or both. One or more of the agents 242 may retrieve the usage data 244. The usage data 244 may be retrieved from the various network devices. For example, the usage data 244 may include the usage data 234 from the RGs 204, the usage data 222 from the CoS queue 220, the usage data 236 from the DPI module 224 or combinations thereof. The agents 242 may regularly retrieve the usage data 244 at set periods of time.

One or more of the agents 242 may retrieve the user information 246. The user information 246 may be retrieved from one or more of the network devices (e.g., the RGs 204, the DSLAMs 206, the SAP 208, or combinations thereof) and from one or more of the data sources 258. One or more of the data sources 258 may include user account information 260. The data sources 258 may include a customer database of a service provider and databases that relate network devices to particular user accounts.

The correlator 248 may determine and store the first network usage 250 for user accounts, the second network usage 252 for user accounts, and the third network usage 254 for user accounts from the usage data 244 and the user information 246. In an embodiment, the first network usage 250 corresponds to network usage for user accounts by location using physical port level identifiers of physical equipment facing subscriber connections (e.g., based on the usage data 234 from the RG 204), the second network usage 252 may be based on session data (e.g., the usage data 222 from the SAP 208), and the third network usage 254 corresponds to network usage at session level by destination and source address (e.g., based on the usage data 236 from the DPI module 224).

In some embodiments, the aggregate usage module 256 may be used. For example, for a particular time interval, the second network usage 252 for the particular time interval may be significantly different than the first network usage 250 for the particular time interval or the third network usage data 254 for the particular time interval (e.g., different by more than a threshold value, such as, but not limited to 1%, 5%, 10% or more). The aggregate usage module 256 may adjust the first network usage 250 for the time period to a different value. For example, the aggregate usage module 256 may adjust the first network usage 250 to the second network usage 252 for the particular time interval, to the third network usage 254 for the particular time interval, or to a value based on both the second network usage 252 for the particular time interval and the third network usage 254 for the particular time interval (e.g., an average usage).

The network usage tracking system 202 may track network usage for selected time periods (e.g., by day or by week) and may track cumulative network usage during a billing cycle. At least a portion of the first network usage 250, the second network usage 252, and the third network usage 254 may be provided to a billing system 262. For example, the cumulative network usage from the first network usage 250, the second network usage 252, and the third network usage 254 may be sent to the billing system 262 at the end of a billing cycle, and the cumulative network usage for each of the first network usage 250, the second network usage 252, and the third network usage 254 may be set to zero at the start of a new billing cycle.

In some embodiments, when the cumulative network usage for a user account exceeds a threshold during a billing cycle, a warning is sent to the billing system 262 for the user account. The cumulative network usage may be the cumulative network usage calculated from one or more of the first network usage 250, the second network usage 252, and the third network usage 254. The billing system 262 may send a warning to a contact for the user account that informs the contact that the user account has or is about to exceed the threshold usage. The warning may indicate that additional usage beyond the threshold usage will result in extra usage charges.

During operation of the system 200, data may be communicated from an end point of the system 200, such as from one or more of the RGs 204. Each RG 204 may be located at a business, a residence, or any other location having access to an end user device, such as an end user computer, a set-top box, or other similar communication device having data capabilities. Data may be communicated from one or more of the RGs 204 to the DSLAMs 206. The data may be transmitted by wireless transmission, by cable, by a digital subscriber line or by a different carrier mechanism or medium. The DSLAMs 206 collect data from multiple RGs 204 and transmit the data over a high speed data connection to the SAP 208. The data may pass to one of the service routers 210, 212. The data may pass from the service routers 210, 212 to the main routers 214, 216. The main routers 214, 216 may forward the data to the internet 218.

Once data is received at the internet 218, the data may be routed over a wide area network to destination devices, such as a destination DSLAM or other telephony or network device that sends data to a receiving end user device. Alternatively, data received at the internet 218 may be routed and stored at one or more servers or other computing devices having access to the internet 218.

Similarly, data received over the internet 218 may be communicated to one or more of the main routers 214, 216. The data received at the main routers 214, 216 may be forwarded to the service routers 210, 212. The service routers 210, 212 may forward the data through the SAP 208 and the DSLAMs 206 to one or more of the RGs 204. Thus, the system 200 allows bi-directional communication between various end user devices over a local or wide area network.

By collecting network usage data at different locations within the system 200 and by evaluating the collected usage data with respect to independently collected user information, the network usage tracking system 202 may correlate the collected data and provide network usage having improved accuracy. Since the network usage tracking system 202 collects data from multiple sources and multiple locations, in the event that certain data is unavailable, corrupted, or otherwise unusable, other data from a different location may be used to supplement or replace the unavailable, corrupted, or otherwise unusable data.

Particular applications of the network usage data obtained from the network usage tracking system 202 include fraud detection, fraud prevention, customer alerting, and network management. For example, the network usage tracking system 202 may be used to identify unusual patterns or patterns inconsistent with prior historical usage to detect anomalous situations that may merit further action by a network administrator.

The network usage for each user account of the system 200 may include some network time protocol (NTP) traffic that is not associated with broadband usage. To accommodate this additional traffic, a predetermined amount of data (e.g., 100 Kbytes/day) may be subtracted from each of the downloaded bytes and uploaded bytes of the first network usage 250, the second network usage 252, and the third network usage 254. All user accounts of the system 200 have some NTP traffic, but the predetermined amount may be chosen so that few, if any, user accounts have more than the predetermined amount of uploaded NTP traffic and the predetermined amount of downloaded NTP traffic.

Figure 3:
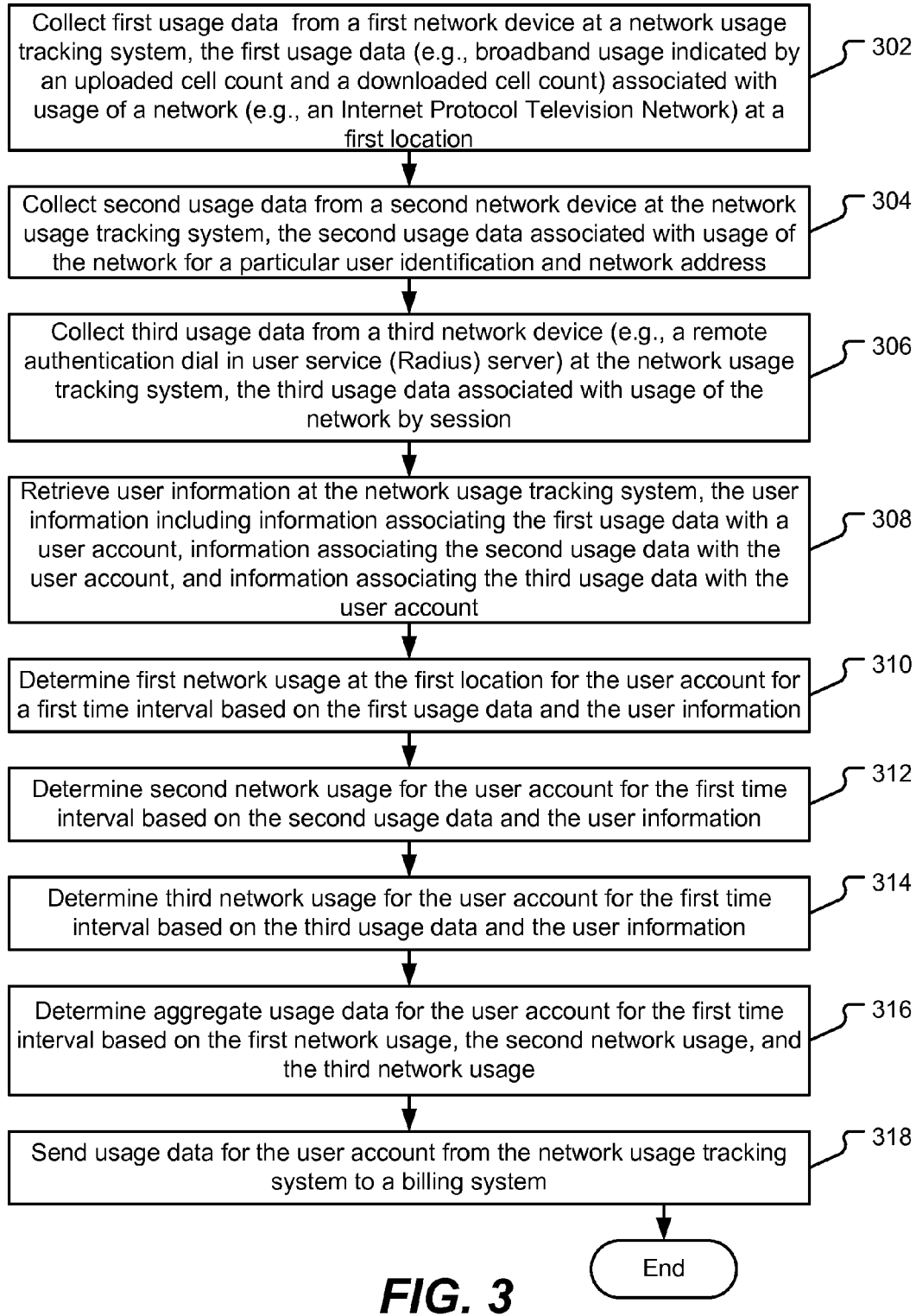
FIG. 3 is a flow diagram of a first particular embodiment of a method to determine network usage.

Referring to FIG. 3, a first particular embodiment of a method to determine network usage is illustrated. The network usage may be broadband usage. The method may include, at 302, collecting first usage data from a first network device at a network usage tracking system. The first usage data may be associated with usage of a network at a first location. The first network device may be at a residential gateway (RG), a digital subscriber line access multiplexer (DSLAM), a remote terminal (RT) or combinations thereof. The form of the first usage data may depend on the type of first network device. The first usage data may be in the form of aggregate packet statistics or cell/frame/packet statistics. The first usage data may include one or more identifiers that allow the data to be associated with particular user accounts. The first usage data may correspond to broadband usage. The network may be a digital subscriber line (DSL) network, an internet protocol television (IPTV) network, a cable access network, or other communication network. The first usage data may include an uploaded cell count and a downloaded cell count.

Second usage data from a second network device may be collected at the network usage tracking system, at 304. The second usage data may be associated with usage of the network for a particular user identification and network address. The usage data may include uploaded bytes and downloaded bytes. The second usage data may correspond to broadband usage. The user identification and network address may allow the second usage data to be associated with particular user accounts. In some embodiments, the second usage data is determined by deep packet inspection (DPI), such as by a DPI module, such as the DPI module 122 of FIG. 1 or the DPI module 224 of FIG. 2.

Third usage data from a third network device may be collected at the network usage tracking system, at 306. The third usage data may be associated with usage of the network by session. The third usage data may include uploaded and downloaded bytes for each session. Each session may be associated with a particular user identification and location. User identifications and locations may allow the third usage data to be associated with particular user accounts. The third network device may be a remote authentication dial in user service (Radius) server. In some embodiments, the third usage data may be data obtained from a service access point (SAP) queue of an IPTV system, such as SAP 208 of FIG. 2.

In some embodiments, only the first usage data and the second usage data are obtained. In some embodiments, only the first usage data and the third usage data are obtained. In some embodiments, only the second usage data and the third usage data are obtained. In other embodiments, additional usage data is obtained.

User information may be retrieved to the network usage tracking system as shown at 308. The user information may include information that enables the first usage data to be associated with user accounts. The user information may include information that enables the second usage data to be associated with user accounts. The user information may also include information that enables the third usage data to be associated with user accounts.

First network usage at the first location for a first time interval may be determined for a user account, at 310. The first usage data may be based on the first usage data and the user information. Second network usage for the user account for the first time interval may be determined, at 312. The second network usage may be based on the second usage data and the user information. Third network usage for the user account for the first time interval may be determined, at 314. The third usage data may be based on the third usage data and the user information. Each of the first network usage, second network usage and third network usage may include uploaded bytes and downloaded bytes for the user account.

Aggregate usage data for the user account for the first time interval may be determined, at 316. The aggregate usage data may be based on the first network usage, the second network usage and the third network usage. For example, when the first time interval is a day and the downloaded bytes from the first network usage is significantly different than the downloaded bytes from the second network usage and the downloaded bytes from the third network usage, the aggregate usage data for the day for the first network usage may be set to the lesser of the downloaded bytes obtained from the second network usage or the third network usage. In some embodiments, the aggregate usage data for the day for the first network usage may be set to the average of the second usage data for the day and the third usage data for the day when there is a significant difference between the first usage data for the day and the usage for the day from the second usage data and the third usage data. In some embodiments, a significant difference may exceed a threshold value, such as, but not limited to 1%, 5%, 10% or more.

The network usage tracking system may send network usage data for the user account to a billing system, at 318. The network usage data may be the first network usage, the second network usage, the third network usage, the aggregate usage data or combinations thereof. The network usage tracking system may send the network usage to the billing system daily, weekly, monthly, at the end of a billing cycle, or combinations thereof. The network usage tracking system may monitor cumulative network usage during a billing cycle for user accounts. When the cumulative network usage exceeds a threshold for a user account, the network usage tracking system may send the billing system an alert for the user account. In response to the alert, the billing system may provide an alert to a contact for the user account informing the contact that normal usage for the user account is, or will soon be, exceeded and that additional charges will be assessed for additional usage.

Figure 4:
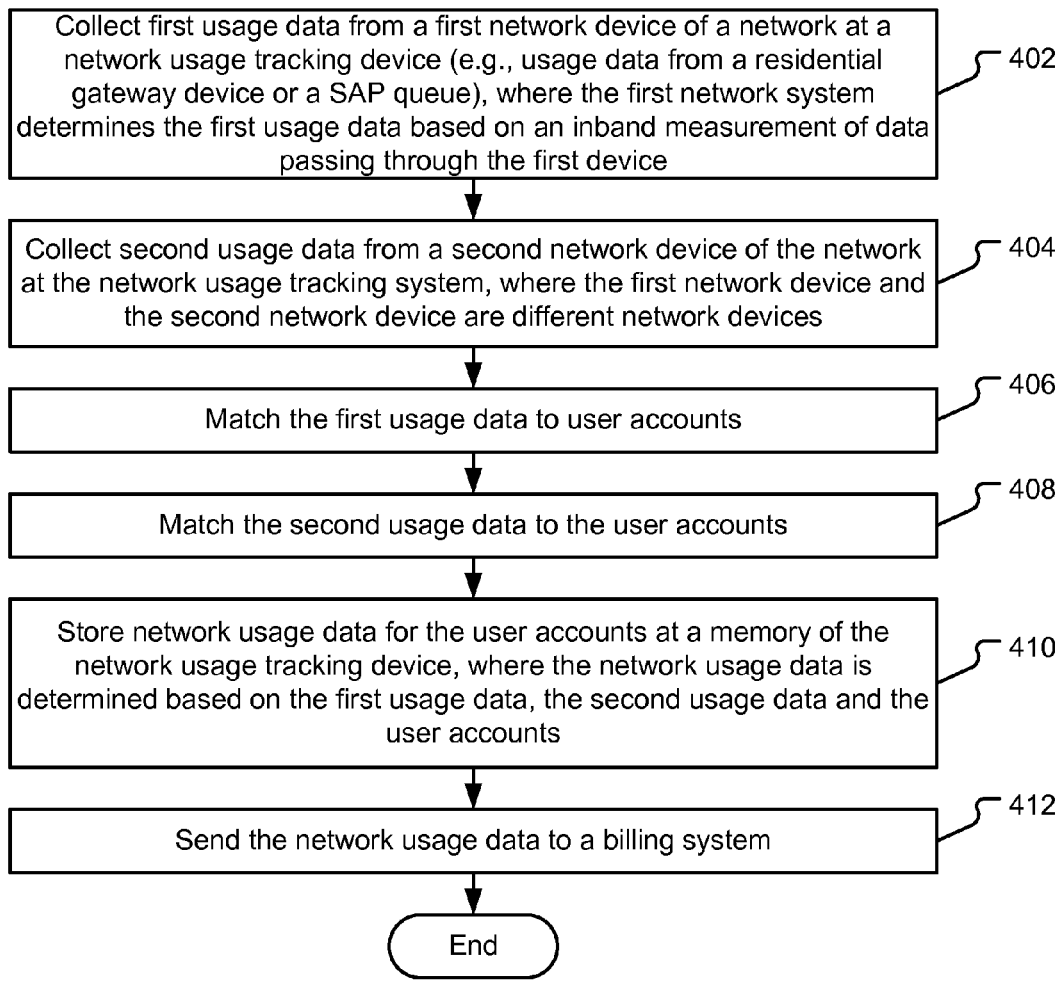
FIG. 4 is a flow diagram of a second particular embodiment of a method to determine network usage.

Referring to FIG. 4, a second particular embodiment of a method to determine network usage is illustrated. The network usage may be broadband usage. The method may include, at 402, collecting first usage data from a first network device of a network at a network usage tracking device. The first network device may determine the first usage data based on an inband measurement of data passing through the first device. In a particular embodiment, the first usage data includes aggregated packet data from a residential gateway device. In a particular embodiment, the first usage data includes usage data 222 from a class of service (CoS) queue 220 from a service access point (SAP) 208, as in FIG. 2.

The method may include, at 404, collecting second usage data from a second network device of the network at the network usage tracking system. The first network device and the second network device are different network devices. In a particular embodiment, the second usage data includes usage data 234 from residential gateways (RG) 204 or usage data 236 from a deep packet inspection (DPI) module 224, as in FIG. 2.

The method may include, at 406, matching the first usage data to user accounts. The method may include, at 408, matching the second usage data to the user accounts.

The method may include, at 410, storing network usage data for the user accounts at a memory of the network usage tracking device. The network usage data may be determined based on the first usage data, the second usage data, and the user accounts.

The method may include, at 412, sending the network usage data to a billing system. The network usage data may be sent to the billing system daily, weekly, monthly, at the end of a billing cycle, or combinations thereof. The network usage tracking system may monitor the cumulative network usage during a billing cycle for user accounts. When the cumulative network usage exceeds a threshold for a user account, the network usage tracking system may send an alert for the user account to the billing system. In response to the alert, the billing system may provide an alert to a contact for the user account informing the contact that normal usage for the user account is, or will soon be, exceeded and that additional charges may be assessed for additional usage.

A service provider may provide different levels of service to user accounts. For example, a service provider may provide the illustrative service levels shown in TABLE 1. Each service level may identify a download speed and an upload speed. The download speed corresponds to an upper data rate limit for downloading data. The upload speed corresponds to an upper data rate limit for uploading data. For a day, the download speed corresponds to a maximum download usage and the upload speed corresponds to a maximum upload usage. An example of values for maximum download usage and maximum upload usage are presented in TABLE 1 for the various service levels.

TABLE 1

| Service Level | Download Speed (kb/s) | Max. Download Usage (Gb/day) | Upload Speed (kb/s) | Max. Upload Usage (Gb/day) |
| --- | --- | --- | --- | --- |
| A | 384 | 4.15 | 384 | 4.15 |
| B | 768 | 8.29 | 384 | 4.15 |
| C | 1536 | 16.59 | 384 | 4.15 |

TABLE 1-continued

| Service Level | Download Speed (kb/s) | Max. Download Usage (Gb/day) | Upload Speed (kb/s) | Max. Upload Usage (Gb/day) |
| --- | --- | --- | --- | --- |
| D | 3008 | 32.49 | 512 | 5.53 |
| E | 6016 | 64.97 | 768 | 8.29 |

A network device (e.g., a DSLAM or a RT) may include cell counters. The network device may have a downstream cell counter and an upstream cell counter. In a particular embodiment, each cell has 53 bytes. In other embodiments, a cell may be smaller or larger than 53 bytes. The change in a downstream cell counter measures usage between an end reading (D1) and an initial reading (D0), except when the cell counter is reset. The time period between taking the initial reading and the end reading may be any desired time where the downstream counter is not able to rollover more than once during the time period. For a DSLAM, a cell may be 53 bytes and the maximum count for each downstream counter may be $(2**32)-1$ or 4,294,976,295 cells. In a single day, an E service level user account can only download a maximum of 64.97 Gb, which corresponds to 1,225,901,887 cells. This number of cells means that even an E service level user account cannot rollover the downstream counter of the DSLAM more than once in a single day. Therefore, a time period between readings of counters for a user account may be one day. Other time periods that inhibit the possibility of more than one counter rollover during such time periods may also be used.

Resets of cell counters do not happen frequently, but occasionally a port is reset, an entire card is reset, a RT is reset or a DSLAM is reset. When a port is reset, the downstream cell counter and the upstream cell counter for the port are reset to 0. When a card, RT or DSLAM are reset, all downstream cell counters and all upstream cell counters may be reset to 0.

Figure 5:
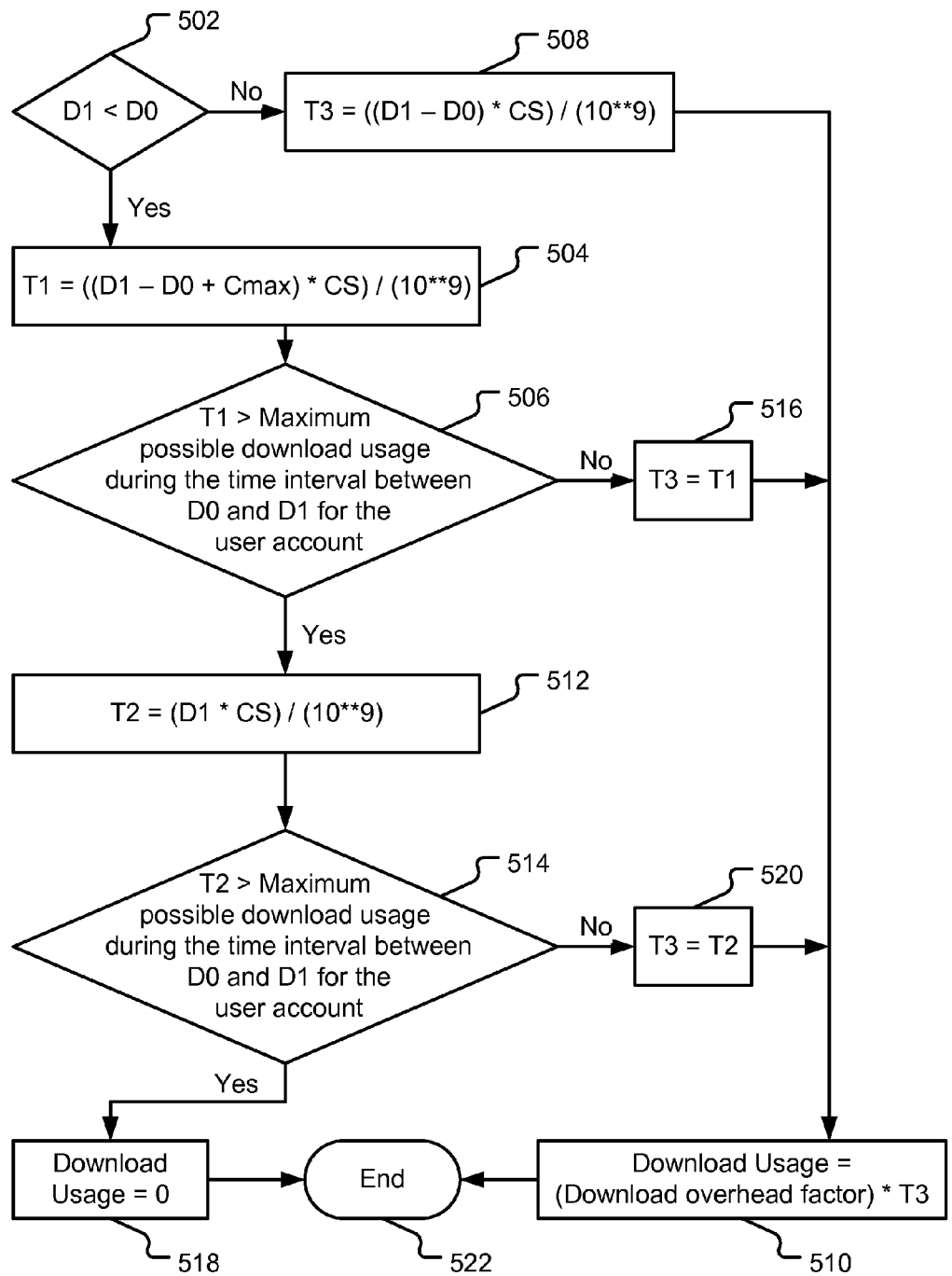
FIG. 5 is a flow diagram of a first particular embodiment of a method to determine downloaded network usage for a user account based on a network device that has a cell counter.

Referring to FIG. 5, a particular embodiment of a method to determine downloaded network usage for a user account based on a network device that has a cell counter is illustrated. The network usage may be broadband usage. The cell counter has a maximum cell count of Cmax. The network device may be a digital subscriber line access multiplexer (DSLAM), a remote terminal (RT), or another type of network device. The downloaded broadband usage may be determined based on an end cell counter reading (D1), an initial cell counter reading (D0), and a service level of the user account. A passage of time between the D0 reading and the D1 reading may be any desired time period that is short enough to inhibit rollover of the cell counter more than once during the time period. In an embodiment, the time period is a day. Each cell may have a cell size of CS (e.g., 53 bytes). At 502, a check may be performed to determine whether D1 is less than D0. When D1 is less than D0, a value for T1 is calculated, at 504. The value for T1 is the total downloaded usage when there has been a rollover of the downstream counter. The method may continue at 506.

When D1 is greater than or equal to D0 at 502, a value for T3 is calculated, at 508. The value for T3 represents the total downloaded usage. The method may continue at 510.

At 506, a check may be made to determine whether the value for T1 is greater than the maximum possible download usage during the time interval between D0 and D1 for the user account. The maximum possible download usage during the time interval between D0 and D1 for the user account may be calculated based on a service level for the user account. When the value for T1 is greater than the maximum possible download usage during the time interval between D0 and D1 for the user account, a value for T2 may be calculated, at 512. The value for T2 is the total downloaded usage assuming that the downstream counter was reset during the time period between the initial reading and the end reading. The value for T2 may underestimate the actual total downloaded usage because the value does not consider any download usage between D0 and the time of the reset. The method may continue at 514.

When the value for T2 is less than or equal to the maximum possible download usage during the time interval between D0 and D1 for the user account, the value of T3 may be set equal to the value of T1, at 516. The method may continue at 510.

At 514, a check may be made to determine whether the value for T2 is greater than the maximum possible download usage during the time interval between D0 and D1 for the user account. When the value for T2 is greater than the maximum possible download usage during the time interval between D0 and D1 for the user account, the download usage is set to 0, at 518. The value of 0 may indicate that the values for D1 and D0 were unreliable and should not be used. After setting the download usage to 0, the method ends at 522.

When the value for T2 is less than or equal to the maximum possible download usage during the time interval between D0 and D1 for the user account, the value of T3 may be set to the value of T2 at 520. The method may continue at 510.

At 510, the download usage is calculated by multiplying the value of T3 by a download overhead factor. The download overhead factor compensates for service provider information included in the total usage for the user account. The download overhead factor may be set to a default value, such as 0.725. After determining the download usage at 510, the method ends at 522.

When a valid downloaded network usage determined from another network device is determined and when the T3 value is determined, at 508, 516 or 520; the valid network usage may be used to determine data for adjusting the value of the download overhead factor. The data may be the T3 value divided by the valid downloaded network usage determined from the other network device. The data may be used as a data point for calculating an updated download overhead correction factor that is substituted for the default download correction factor. Statistical calculations may also be calculated to track the reliability of the updated download overhead correction factor.

Figure 6:
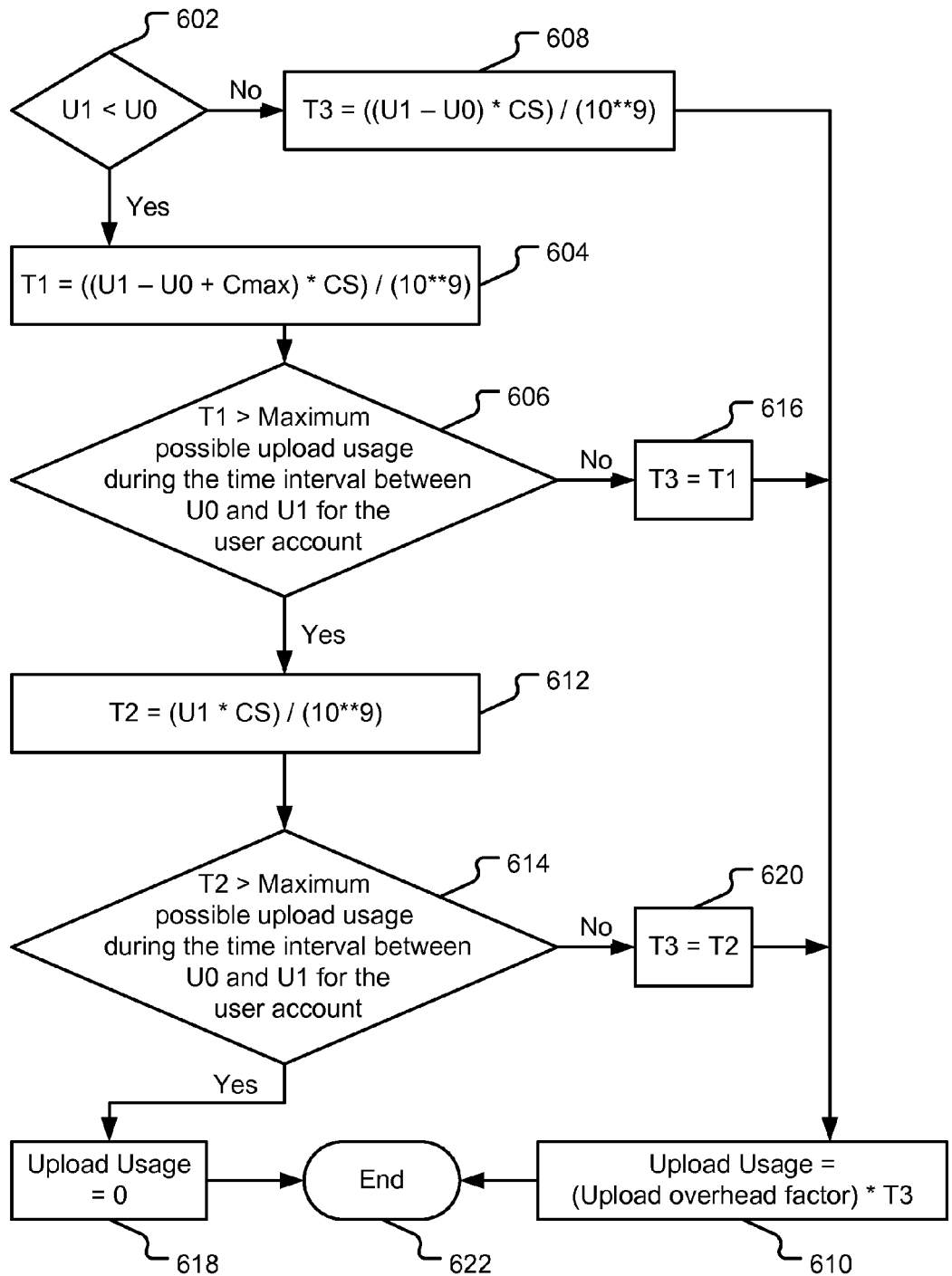
FIG. 6 is a flow diagram of a particular embodiment of a method to determine uploaded network usage for a user account based on a network device that has a cell counter.

Referring to FIG. 6, a particular embodiment of a method to determine uploaded network usage for a user account based on a network device that has a cell counter is illustrated. The network usage may be broadband usage. FIG. 6 depicts a method of calculating the uploaded network usage whereas FIG. 5 depicts a method of calculating the downloaded network usage. The cell counter has a maximum cell count of Cmax. The network device may be a digital subscriber line access multiplexer (DSLAM), a remote terminal (RT), or another type of network device. The uploaded broadband usage may be determined based on an end cell counter reading (U1), an initial cell counter reading (U0), and a service level of the user account. A passage of time between the U0 reading and the U1 reading may be any desired time period that is short enough to inhibit rollover of the cell counter more than once during the time period. In an embodiment, the time period is a day. Each cell may have a cell size of CS (e.g., 53 bytes). At 602, a check may be performed to determine whether U1 is less than U0. When U1 is less than U0, a value for T1 is calculated, at 604. The value for T1 is the total uploaded usage when there has been a rollover of the upstream counter. The method may continue at 606.

When U1 is greater than or equal to U0 at 602, a value for T3 is calculated, at 608. The value for T3 represents the total uploaded usage. The method may continue at 610.

At 606, a check may be made to determine whether the value for T1 is greater than the maximum possible upload usage during the time interval between U0 and U1 for the user account. The maximum possible upload usage during the time interval between U0 and U1 for the user account may be calculated based on a service level for the user account. When the value for T1 is greater than the maximum possible upload usage during the time interval between U0 and U1 for the user account, a value for T2 may be calculated, at 612. The value for T2 is the total uploaded usage assuming that the upstream counter was reset during the time period between the initial reading and the end reading. The value for T2 may underestimate the actual total uploaded usage because the value does not consider any uploaded usage between U0 and the time of the reset. The method may continue at 614.

When the value for T2 is less than or equal to the maximum possible upload usage during the time interval between U0 and U1 for the user account, the value of T3 may be set equal to the value of T1, at 616. The method may continue at 610.

At 614, a check may be made to determine whether the value for T2 is greater than the maximum possible upload usage during the time interval between U0 and U1 for the user account. When the value for T2 is greater than the maximum possible upload usage during the time interval between U0 and U1 for the user account, the upload usage is set to 0, at 618. The value of 0 may indicate that the values for U1 and U0 were unreliable and should not be used. After setting the upload usage to 0, the method ends at 622.

When the value for T2 is less than or equal to the maximum possible upload usage during the time interval between U0 and U1 for the user account, the value of T3 may be set to the value of T2 at 620. The method may continue at 610.

At 610, the upload usage is calculated by multiplying the value of T3 by an upload overhead factor. The upload overhead factor compensates for service provider information included in the total usage for the user account. The upload overhead factor may initially be set to a default value, such as 0.642. After determining the upstream usage at 610, the method ends at 622.

When a valid uploaded network usage determined from another network device is determined and when the T3 value is determined, at 608, 616 or 620; the valid network usage may be used to determine data for adjusting the value of the upload overhead factor. The data may be the T3 value divided by the valid uploaded network usage determined from the other network device. The data may be used as a data point for calculating an updated upload overhead correction factor that is substituted for the default upload correction factor. Statistical calculations may also be calculated to track the reliability of the updated upload overhead correction factor.

In some embodiments, a Radius server may be used to determine network usage by session. The usage data provided by the Radius server may include a username, an internet protocol (IP) address, a location identification, upload usage and download usage for each session for a given username. The usage data may include a time stamp and a status type. The timestamp indicates when data is recorded. The status type may be one of Start, Stop, or Interim. Start indicates when a session begins. Stop indicates when a session ends and includes data for the uploaded bytes and downloaded bytes since the Start or since the previous Interim. Interim indicates an ongoing session and includes data for the uploaded bytes and downloaded bytes since the Start or last Interim. An Interim record may be generated once a day.

A list of all usernames associated with a user account may be provided when retrieving usage data from the Radius server for a user account to reduce processing time. When a Start is reported on a first day, but is not followed by a Stop or Interim in the first day, usage data related to a Stop, Interim or both received on a second day that follows the first day and is related to the Start may be used in determining the usage for the second day.

In some cases, a username may be associated with usage at different physical locations. The Radius server may provide a username, an IP address, a location identification, an upload usage and a download usage for each session for each username. The location identification may be based on a broadband remote access server (BRAS) name, port, virtual port identifier (VPI), virtual circuit identifier (VCI), other network device or virtual device, or combinations thereof for each session. For example, for a particular day and a user account associated only with Username1, the Radius server may provide:

Username1 with IP Address 1, location 1, session 1 usage;
Username1 with IP Address 2, location 1, session 2 usage;
Username1 with IP Address 3, location 2, session 3 usage.

Each session usage may include upload usage and download usage. The usage data from the Radius server may be sorted based on username and location matches. Session usage may be summed for username and location matches. In the above-example, the daily end result may be:

Username1, location 1, Total Upload Usage, Total Download Usage;
Username1, location 2, Total Upload Usage, Total Download Usage.

In some embodiments, broadband usage may be determined from usage data determined using a deep packet inspection (DPI) device. The DPI device may provide usage data at regular intervals (e.g., 5 minute intervals). A script may be used to generate the daily usage for individual user accounts. For example, for a particular day and a user account associated only with Username1, the script may output:

Username1 with IP address 1, Total Upload Usage, Total Download Usage
Username1 with IP address 2, Total Upload Usage, Total Download Usage
Username1 with IP address 3, Total Upload Usage, Total Download Usage Then, the username may be matched with records from a Radius server to establish a location identification. The location identification may be based on a BRAS name, port, VPI, VCI or combinations thereof for each session identified in the Radius server. In the above-example, the daily end result may be:

Username1, location 1, Total Upload Usage, Total Download Usage;
Username1, location 2, Total Upload Usage, Total Download Usage.

The daily end result may enable usage data obtained from the DPI device to be associated with a user account.

In some embodiments, the IP addresses of the script output are matched to residential gateway IP addresses. The residential gateway IP addresses are then matched to user accounts.

In a particular embodiment, the deep packet DPI device is able to monitor network usage by application types, destination IP address, or both. Monitoring the network usage by application types may allow a network usage tracking system to exclude certain types of traffic (e.g., upstream traffic, downstream traffic, or both) from the total usage sent to a billing system.

Figure 7:
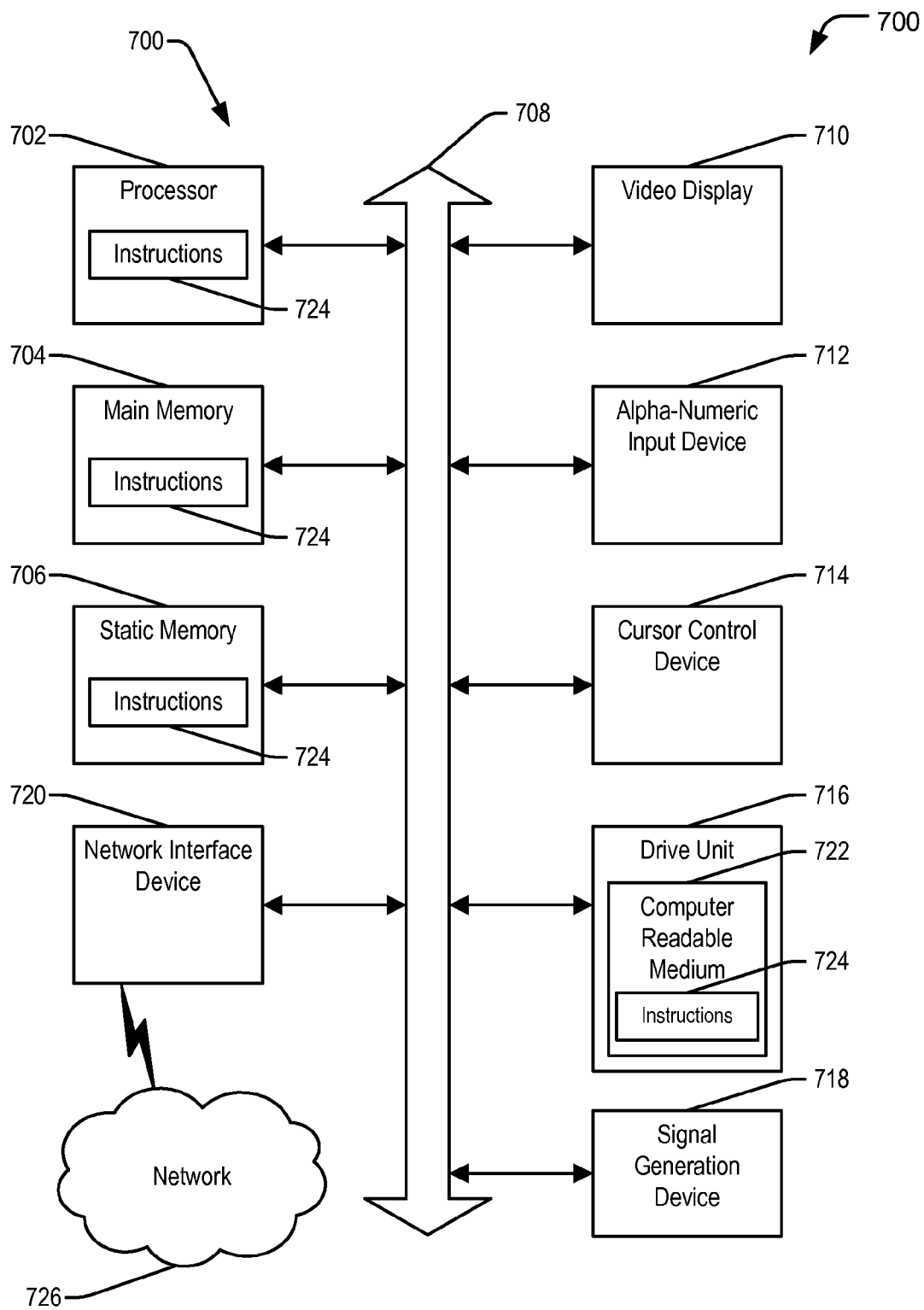
FIG. 7 is a block diagram of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the RGs 104, 134 and 204, the DSLAMs 106 and 206, the BRAS 110, the SAP 208, the routers 112, 114, 210, 212, 214 and 216, the DPI modules 122 and 222, the network usage tracking systems 102 and 202, and the billing systems 170 and 262 described with reference to FIGS. 1 and 2.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a projection television system, a flat panel display, or a solid state display. Additionally, the computer system 700 may include an input device 712, such as a keyboard, and a cursor control device 714, such as a mouse. The computer system 700 may also include a disk drive unit 716, a signal generation device 718, such as a speaker or remote control, and a network interface device 720. Some computer systems 700 may not include an input device (e.g., a server may not include an input device).

In a particular embodiment, as depicted in FIG. 7, the disk drive unit 716 may include a computer-readable storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 724 or receives, stores and executes instructions 724 responsive to a propagated signal, so that a device connected to a network 726 may communicate voice, video or data over the network 726. Further, the instructions 724 may be transmitted or received over the network 726 via the network interface device 720.

While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   determining, at a network tracking system, for a particular user account first network usage of a network during a first time interval based on first network usage data retrieved from a first network device of the network, wherein the first network usage data corresponds to usage of the network associated with a plurality of user accounts, wherein determining the first network usage comprises adjusting the first network usage data to compensate for network overhead bytes counted in the first network usage data, and wherein adjusting the first network usage data comprises applying at least one of an upload correction factor to a first uploaded bytes value determined from a first uploaded cell count of the first network usage data and a download correction factor to a first downloaded bytes value determined from a first downloaded cell count of the first network usage data;
   determining for the particular user account second network usage of the network during the first time interval based on second network usage data retrieved from a second network device of the network, wherein the second network usage data corresponds to the usage of the network, wherein the second network device is distinct from the first network device, and wherein the first network device and the second network device are network devices that direct network traffic in the network;

determining for the particular user account aggregate network usage of the network during the first time interval based on the first network usage and the second network usage, wherein the aggregate network usage is determined by computing an average of the first network usage and the second network usage when a difference exists between the first network usage and the second network usage, the difference not exceeding an accuracy threshold; and sending the aggregate network usage associated with the particular user account to a billing system;

wherein the upload correction factor is determined based on the first uploaded bytes value and a second uploaded bytes value determined from the second network usage data when the second uploaded bytes value satisfies an upload threshold determined based on an upper data upload rate limit available to the particular user account; and wherein the download correction factor is determined based on the first downloaded bytes value and a second downloaded bytes value determined from the second network usage data when the second downloaded bytes value satisfies a download threshold determined based on an upper data download rate limit available to the particular user account.

2. The method of claim 1, wherein the first network usage data is based on an inband measurement of data passing through the first network device, and wherein the second network usage data is based on usage of the network identified from user identification and network address.

3. The method of claim 1, wherein the first network usage data and the second network usage data corresponds to broadband usage data.

4. The method of claim 3, wherein the network comprises one of an Internet Protocol Television network, a digital subscriber line network, and a cable access network.

5. The method of claim 1, wherein the first network usage data and the second network usage data comprise at least one of network packet statistics, network cell statistics, network frame statistics, an uploaded cell count, and a downloaded cell count.

6. The method of claim 5, wherein the first network usage data is collected at a second time interval having a length such that a counter of the first network device does not roll over more than a single time during the second time interval based on at least one of the upper data download rate limit and the upper data upload rate limit for the particular user account.

7. The method of claim 1, wherein the first network device comprises one of a digital subscriber line access multiplexer, a remote terminal, and a remote authentication dial in user service server.

8. The method of claim 1, wherein the first network usage data corresponds to at least one of broadband usage data, video transmission data, or a combination thereof.

9. The method of claim 1, wherein the first network device comprises a residential gateway.

10. The method of claim 1, wherein the second network device comprises a deep packet inspection device.

11. The method of claim 1, wherein the first network device and the second network device direct the network traffic in the network to a router.

12. The method of claim 1, wherein the first time interval is one of a day, a week, and a month.

13. The method of claim 1, wherein the accuracy threshold is one of one percent, five percent, and ten percent.

14. The method of claim 1, further comprising: monitoring, at the network usage tracking system, cumulative network usage associated with the particular user account during a billing interval; and generating an alert when the cumulative network usage associated with the particular user account exceeds a threshold.

15. The method of claim 1, wherein the first network device is a service access point that comprises a class of service queue that collects and stores the first network usage data.

16. A network usage tracking system, comprising: at least one processor; and at least one memory accessible to the at least one processor, the at least one memory comprising:

a first agent executable by the at least one processor to determine for a particular user account first network usage of a network during a first time interval based on first network usage data retrieved from a first network device of the network, wherein the first network usage data corresponds to usage of the network associated with a plurality of user accounts, wherein determining the first network usage comprises adjusting the first network usage data to compensate for network overhead bytes counted in the first network usage data, and wherein adjusting the first network usage data comprises applying at least one of an upload correction factor to a first uploaded bytes value determined from a first uploaded cell count of the first network usage data and a download correction factor to a first downloaded bytes value determined from a first downloaded cell count of the first network usage data;

a second agent executable by the at least one processor to determine for the particular user account second network usage of the network during the first time interval based on second network usage data retrieved from a second network device of the network, wherein the second network usage data corresponds to the usage of the network, wherein the second network device is distinct from the first network device, and wherein the first network device and the second network device are network devices that direct network traffic in the network; and an aggregate usage module executable by the at least one processor to determine for the particular user account aggregate network usage of the network during the first time interval based on the first network usage and the second network usage, wherein the aggregate network usage is determined by computing an average of the first network usage and the second network usage when a difference exists between the first network usage and the second network usage, the difference not exceeding an accuracy threshold;

wherein the upload correction factor is determined based on the first uploaded bytes value and a second uploaded bytes value determined from the second network usage data when the second uploaded bytes value satisfies an upload threshold determined based on an upper data upload rate limit available to the particular user account; and wherein the download correction factor is determined based on the first downloaded bytes value and a second downloaded bytes value determined from the second network usage data when the second downloaded bytes value satisfies a download threshold determined based on an upper data download rate limit available to the particular user account;

wherein the network usage tracking system is configured to send the aggregate network usage associated with the particular user account to a billing system.

17. The network usage tracking system of claim 16, wherein the difference is determined based on at least one of a downloaded bytes value and an uploaded bytes value based on the first network usage data and the second network usage data, wherein the downloaded bytes value includes the first downloaded bytes value and the second downloaded bytes value, and wherein the uploaded bytes value includes the first uploaded bytes value and the second uploaded bytes value.

18. A network usage tracking system, comprising: at least one processor; and at least one memory accessible to the at least one processor, the at least one memory comprising:
- a first agent executable by the at least one processor to determine for a particular user account first network usage of a network during a first time interval based on first network usage data retrieved from a first network device of the network, wherein the first network usage data corresponds to usage of the network associated with a plurality of user accounts, wherein determining the first network usage comprises adjusting the first network usage data to compensate for network overhead bytes counted in the first network usage data, and wherein adjusting the first network usage data comprises applying at least one of an upload correction factor to a first uploaded bytes value determined from a first uploaded cell count of the first network usage data and a download correction factor to a first downloaded bytes value determined from a first downloaded cell count of the first network usage data;
- a second agent executable by the at least one processor to determine for the particular user account second network usage of the network during the first time interval based on second network usage data retrieved from a second network device of the network, wherein the second network usage data corresponds to the usage of the network, wherein the second network device is distinct from the first network device, and wherein the first network device and the second network device are network devices that direct network traffic in the network; and
- an aggregate usage module executable by the at least one processor to determine for the particular user account aggregate network usage of the network during the first time interval based on the first network usage and the second network usage, wherein the aggregate network usage is determined by computing an average of the first network usage and the second network usage, and wherein prior to determining the aggregate network usage, the aggregate usage module adjusts the first network usage to the second network usage for the first time interval when a difference exists between the first network usage and the second network usage associated with the particular user account for the first time interval, the difference indicating that the first network usage does not correlate to the second network usage, the difference exceeding a correlation threshold;
- wherein the upload correction factor is determined based on the first uploaded bytes value and a second uploaded bytes value determined from the second network usage data when the second uploaded bytes value satisfies an upload threshold determined based on an upper data upload rate limit available to the particular user account; and
- wherein the download correction factor is determined based on the first downloaded bytes value and a second downloaded bytes value determined from the second network usage data when the second downloaded bytes value satisfies a download threshold determined based on an upper data download rate limit available to the particular user account;
- wherein the network usage tracking system is configured to send the aggregate network usage associated with the particular user account to a billing system.

19. The network usage tracking system of claim 18, wherein the correlation threshold is one of one percent, five percent, and ten percent.

20. A computer-readable storage device comprising instructions that, when executed by a processor, cause the processor to perform a method comprising:
- determining, at a network tracking system, for a particular user account first network usage of a network during a first time interval based on first network usage data retrieved from a first network device of the network, wherein the first network usage data corresponds to usage of the network associated with a plurality of user accounts, wherein determining the first network usage comprises adjusting the first network usage data to compensate for network overhead bytes counted in the first network usage data, and wherein adjusting the first network usage data comprises applying at least one of an upload correction factor to a first uploaded bytes value determined from a first uploaded cell count of the first network usage data and a download correction factor to a first downloaded bytes value determined from a first downloaded cell count of the first network usage data;
- determining for the particular user account second network usage of the network during the first time interval based on second network usage data retrieved from a second network device of the network, wherein the second network usage data corresponds to the usage of the network, wherein the second network device is distinct from the first network device, and wherein the first network device and the second network device are network devices that direct network traffic in the network;
- determining for the particular user account aggregate network usage of the network during the first time interval based on the first network usage and the second network usage, wherein the aggregate network usage is determined by computing an average of the first network usage and the second network usage when a difference exists between the first network usage and the second network usage, the difference not exceeding an accuracy threshold; and
- sending the aggregate network usage associated with the particular user account to a billing system;
- wherein the upload correction factor is determined based on the first uploaded bytes value and a second uploaded bytes value determined from the second network usage data when the second uploaded bytes value satisfies an upload threshold determined based on an upper data upload rate limit available to the particular user account; and
- wherein the download correction factor is determined based on the first downloaded bytes value and a second downloaded bytes value determined from the second network usage data when the second downloaded bytes value satisfies a download threshold determined based on an upper data download rate limit available to the particular user account.

21. The computer-readable storage device of claim 20, wherein the first network usage data is based on an inband measurement of data passing through the first network device, and wherein the second network usage data is based on usage of the network identified from a user identification and a network address.

22. The computer-readable storage device of claim 21, wherein the method further comprises determining for the particular user account third network usage of the network during the first time interval based on third network usage data retrieved from a third network device of the network, wherein the third network usage data corresponds to the usage of the network, wherein the third network device is distinct from the second network device and the first network device, and wherein the third network device directs the network traffic in the network; and wherein the aggregate network usage is determined by computing an average of the first network usage, the second network usage, and the third network usage when a difference exists between the first network usage, the second network usage, and the third network usage, the difference not exceeding the accuracy threshold.

* * * * *